United States Patent [19]

Isomura

[11] Patent Number: 5,566,375
[45] Date of Patent: Oct. 15, 1996

[54] MAGNETIC DISK DRIVE HAVING VOICE COIL MOTOR FOR MOVING A CARRIAGE AND ROCKING MECHANISM FOR LOCKING THE CARRIAGE

[75] Inventor: Akihiro Isomura, Tokyo, Japan

[73] Assignee: Kabushiki Kaisha Toshiba, Japan

[21] Appl. No.: 204,621

[22] Filed: Mar. 1, 1994

[30] Foreign Application Priority Data

Mar. 1, 1993 [JP] Japan .................................. 5-040274

[51] Int. Cl.⁶ ........................................................ G11B 5/56
[52] U.S. Cl. ........................................... 360/105; 360/106
[58] Field of Search ....................................... 360/105, 106, 360/86

[56] References Cited

U.S. PATENT DOCUMENTS

| 5,003,422 | 3/1991 | Sun et al. | 360/105 |
| 5,005,095 | 4/1991 | Wagner | 360/106 |
| 5,023,736 | 6/1991 | Kelsic et al. | 360/105 |
| 5,187,627 | 2/1993 | Hickox et al. | 360/105 |
| 5,233,493 | 8/1993 | Eliason | 360/106 |
| 5,295,031 | 3/1994 | Wasson | 360/106 |
| 5,369,538 | 11/1994 | Moe et al. | 360/105 |

Primary Examiner—Stuart S. Levy
Assistant Examiner—Brian E. Miller
Attorney, Agent, or Firm—Limbach & Limbach L.L.P.; Ronald L. Yin

[57] ABSTRACT

A hard disk drive comprises a voice coil motor for swinging a carriage about a support shaft, and a lock mechanism for locking the carriage in a desired position. The motor has a coil fixed to the carriage, and a motor magnet opposing to the coil and having an arcuate surface coaxial with the support shaft. The lock mechanism comprises a magnetic member attached to the carriage and movable in an arcuate path coaxial with the support shaft in accordance with the swing of the carriage, while opposing to the arcuate surface of the motor magnet, and a locking magnet provided near the arcuate path of the carriage, for attracting the magnetic member when the carriage is swung to the desired position. The arcuate surface of the motor magnet includes an opposing region which is opposed to the arcuate path of the magnetic member and a non-opposing region which is continuous to the opposing region. The motor magnet has a recess formed only in the non-opposing region.

16 Claims, 3 Drawing Sheets

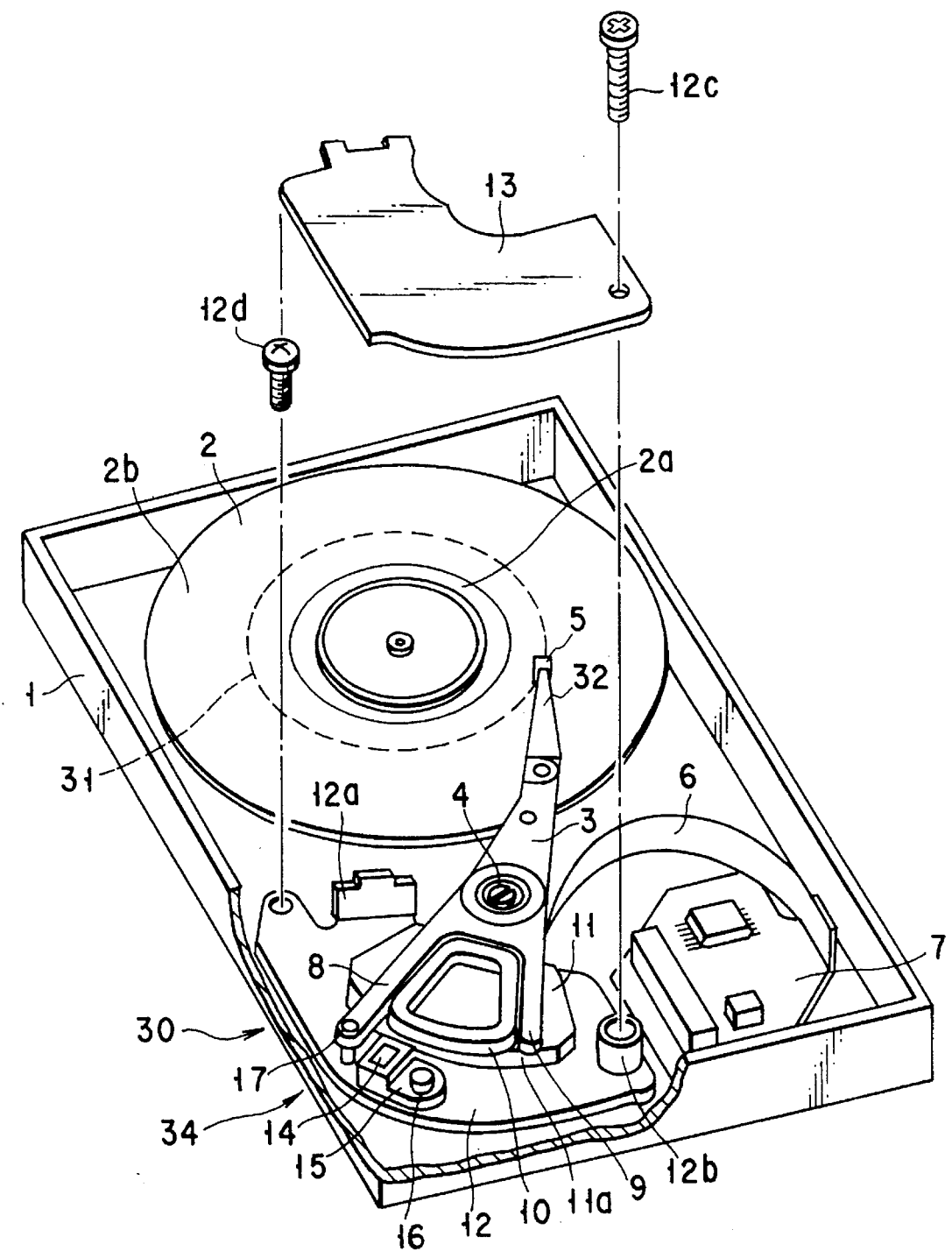
F I G. 1

MAGNETIC DISK DRIVE HAVING VOICE COIL MOTOR FOR MOVING A CARRIAGE AND ROCKING MECHANISM FOR LOCKING THE CARRIAGE

BACKGROUND OF THE INVENTION

1. Field of the Invention

The present invention relates to a magnetic disk drive used to store information in a computer such as a large-scale computer, a personal computer, a lap-top type computer, etc..

2. Description of the Related Art

A magnetic disk drive, for example, a hard disk drive (hereafter referred to "HDD"), generally comprises a spindle motor for rotationally driving a magnetic disk serving as a magnetic recording medium, and a carriage supporting a magnetic head. As the carriage is swung by means of a voice coil motor (hereafter referred to as "VCM"), the magnetic head is moved over the disk in substantially its radial direction and positioned on a predetermined track of the disk.

The VCM for swinging the carriage comprises upper and lower yokes, which face each other with a distance therebetween. A magnet is fixed to one of the yokes. A voice coil, fixed to the carriage, is interposed between the upper and lower yokes. When the voice coil is excited, the carriage is swung in a predetermined direction by interaction between the magnetic field generated by the voice coil and the magnetic field generated by the magnet.

A magnetic disk has a data zone and a CSS (contact-start-stop) zone, which is an innermost area of the disk, independent of the data zone. The CSS zone is provided to prevent the data zone from being damaged in a nonoperating state of the HDD and in the starting or stopping of the spindle motor. Specifically, when the power is turned off (when the disk is stopped), the magnetic head is brought into contact with the CSS zone of the disk and stopped. When the power is turned on, with the result that the rotation speed of the disk is increased, the magnetic head flies over the disk and is moved by the VCM toward the outer circumference of the disk, i.e., to the data zone.

In the state of the power being off, it is possible that the magnetic head may slide on the surface of the disk due to, for example, some vibration or shock, in which case the disk surface may be damaged by the magnetic head. To prevent this, the HDD comprises a lock mechanism for locking the carriage to hold the magnetic head in a predetermined position, i.e., the CSS zone. As an example of the lock mechanism, U.S. Pat. No. 5,023,736 discloses a magnetic carriage lock mechanism which is provided with a locking magnet and a magnetic member fixed to the carriage and attracted to the locking magnet so that the carriage does not move.

Two torque characteristics are indispensable to the above lock mechanism: one being a large locking torque; and the other a small offset torque. (The locking torque is a holding force for locking the carriage in a position where the magnetic head is situated on the CSS zone. The offset torque is an external force which the magnetic member receives from the VCM magnet, the locking magnet and the like, while the carriage is being swung).

To accurately control the operation of the carriage, it is desirable that the offset torque be kept as small and constant as possible. Therefore, to keep the attractive force of the VCM magnet which acts on the magnetic member constant, the outer peripheral edge of the VCM magnet is formed in a circular arc coaxial with the pivotal center of the carriage, so that the distance between the magnetic member and the VCM magnet is kept constant, independent of the swung position of the carriage.

Recently, a demand, for an increase in the capacity of the HDD as described above, has arisen. To increase the capacity of the HDD, it is proposed that the number of magnetic recording media be increased.

In this case, however, the number of magnetic heads should be increased in accordance with the number of magnetic recording media. Accordingly, the moment of inertia of the carriage is also increased. Hence, to obtain a desired seek performance, it is necessary to increase the driving torque of the VCM to a level corresponding to the increased moment of inertia of the carriage.

The driving torque of the VCM can be increased by increasing the thickness of the magnet, without changing the plane configuration, to increase the amount of flux. However, in this case, since the diffusion of flux in a peripheral portion of the magnet is increased in accordance with an increase in the thickness, the linearity of the driving torque is undesirably lowered.

The lowering of linearity of the driving torque means an increase in the difference between the torque obtained when the voice coil is positioned at a central portion of the magnet in its circumferential direction (the direction of the movement of the coil) and the torque obtained when the voice coil is positioned in each end portion of the magnet with respect to the circumferential direction. When the linearity of the driving torque of the VCM is low, it is difficult to accurately control the movement of the carriage, i.e., the positioning of the magnetic head.

SUMMARY OF THE INVENTION

The present invention has been contrived in consideration of the above circumstances, and its object is to provide a magnetic disk drive which can accurately control the positioning of the magnetic head, even when the driving torque of the VCM is increased.

To achieve the above object, a magnetic disk drive according to the present invention comprises: a case containing a recording medium; a carriage arranged in the case and swingable about a support shaft, between a first position and a second position; head means supported by the carriage, for processing information with respect to the recording medium; drive means for swinging the carriage to move the head means to a desired portion of the recording medium; and lock means for locking the carriage in the first position.

The drive means has a coil fixed to the carriage and movable in an arcuate path coaxial with the support shaft in accordance with the swing of the carriage; and a drive magnet opposing to the coil over a range in which the coil is movable and having an arcuate surface coaxial with the support shaft. The lock means comprises a magnetic member attached to the carriage and movable in an arcuate path coaxial with the support shaft in accordance with the swing of the carriage, while opposing to the arcuate surface of the drive magnet; and a locking magnet provided near the arcuate path of the carriage, for attracting the magnetic member when the carriage is swung to the first position. The arcuate surface of the drive magnet includes an opposing region which is opposed to the arcuate path of the magnetic member and a non-opposing region which is continuous to the opposing region. The drive magnet having a recess formed only in the non-opposing region.

With the above magnetic disk drive, the opposing region of the arcuate surface of the drive magnet is shaped into an arc without a recess. Hence, when the carriage is rotated between the first and the second positions, the magnetic member is moved, keeping a predetermined distance from the drive magnet. Therefore, an external force, which is generated from the drive magnet and acts on the magnetic member, i.e., an attraction force, is kept constant, thus preventing change in the offset torque due to the attraction force of the drive magnet.

In addition, the recess is formed only in the non-opposing region of the arcuate surface of the drive magnet, which does not face the arcuate path of the magnetic member, the magnetic flux generated from that portion of the drive magnet which is adjacent to the recess is reduced as compared to the other portion of the magnet. Therefore, when the coil of the drive means passes by the recess, the magnetic flux which is generated from the drive magnet and acts on the coil is reduced, thereby reducing the drive torque of the drive means. Since the magnetic flux generated from both ends of the drive magnet is less than the other portion as described above, the driving torque is reduced when the carriage is moved near the first and the second positions. Further, owing to the recess, the driving torque is reduced when the carriage is positioned in a halfway portion between the first and the second positions, so that the driving torque of the drive means as a whole is substantially constant.

Therefore, even if the drive magnet is thick, the torque linearity of the drive means can be improved, without adversely affecting the offset torque. As a result, it is possible to provide a magnetic disk drive in which the movement of the carriage, i.e., the positioning of the magnetic head, can be accurately controlled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 3 show an HDD according to an embodiment of the present invention, in which:

FIG. 1 is a perspective view showing the HDD in a case where a top cover is removed, FIG. 2 is a plan view showing part of a VCM and a carriage of the HDD, and FIG. 3 is a plan view showing part of the VCM;

FIGS. 5A to 5D show driving torque characteristics of various VCMs, wherein

FIG. 5A is a graph showing the driving characteristics of a VCM having a relatively thin motor magnet, FIG. 5B is a graph showing the driving characteristics of a VCM having a relatively thick motor magnet, FIG. 5C is a graph showing the driving characteristics of a VCM having a relatively thick motor magnet including a pair of recesses, and FIG. 5D is a graph showing the driving characteristics of the VCM according to the embodiment of the present invention.

DETAILED DESCRIPTION OF THE PREFERRED EMBODIMENT

Figure 2:
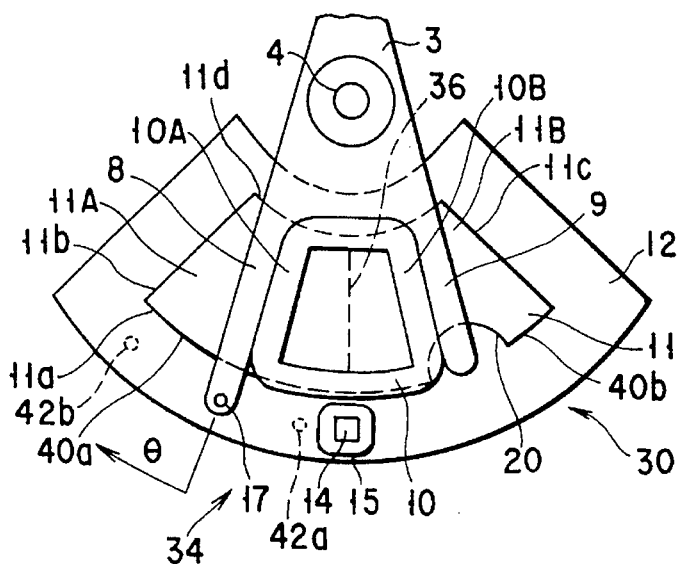

An embodiment in which the present invention is applied to an HDD will be described with reference to the accompanying drawings.

As shown in FIG. 1, an HDD comprises a rectangular case 1. The case 1 has a rectangular bottom plate and side walls erected along the periphery of the bottom plate. The upper opening of the case 1 is closed by means of a detachable top cover (not shown).

The case 1 contains a magnetic disk 2, serving as a recording medium, which is rotationally driven by a spindle motor 31 mounted on the bottom plate of the case 1. The magnetic disk 2 has a CSS zone 2a located in an innermost portion of the disk 2 and a data zone 2b, located outside the CSS zone, in which data is recorded.

The case 1 also contains a pair of magnetic heads 5 (only one of which is shown) for recording and reproducing data to and from the magnetic disk 2, a carriage 3 supporting the magnetic heads, and a voice coil motor (VCM) 30 for driving the carriage.

The carriage 3 is swingably supported by a support shaft 4 mounted on the bottom plate of the case, parallel to the rotation shaft of the spindle motor 31. The carriage 3 includes a pair of suspensions 32 (only one of which is shown) extending above the surfaces of the magnetic disk 2. The magnetic head 5 is attached to a distal end portion of the corresponding suspension 32 and moved above the magnetic disk 3 in its radial direction in accordance with the swing motion of the carriage 3. The carriage 3 is swingable between a first position in which the magnetic head 5 is located on the CSS zone 2a of the magnetic disk 2 and a second position in which the magnetic head is located on the outermost portion of the magnetic disk 2. In the case of an HDD of the CSS system, the magnetic head 5 stands by on the CSS zone 2a in a nonoperating state of the HDD. In the operating state, it is moved to the data zone 2b by the carriage 3 to record or reproduce data.

The magnetic head 5 is electrically connected to a printed circuit board 7 mounted on the bottom plate of the case 1 through a lead line (not shown) and a flexible cable 6 connected to the carriage 3.

The VCM 30 comprises a motor magnet 11 serving as a drive magnet, a voice coil 10, a lower yoke 12 and an upper yoke 13. The lower yoke 12 is fixed to the bottom plate of the case 1. An end portion of the lower yoke 12 is bent upward so as to form an upright portion 12a. A support post 12b is provided at the other end portion of the lower yoke 12. The upper yoke 13 is fixed to the top portions of the support post 12b and the upright portion 12a by means of screws 12c and 12d, and opposite to the lower yoke 12 with a predetermined distance therebetween. The magnet 11 is fixed to the lower yoke 12.

The voice coil 10 is fixed to an end portion of the carriage 3. More specifically, the carriage 3 has a pair of arms 8 and 9 which extend from the support shaft 4 in the direction opposite to the magnetic disk 2, and which are arranged separately from each other in the direction of swing of the carriage 3. The coil 10 is fixed between the arms 8 and 9, and positioned between the motor magnet 11 and the upper yoke 13. The coil 10 is movable within a predetermined range in an arc coaxial with the support shaft 4 in accordance with the swing of the carriage 3, between the magnet 11 and the upper yoke 13. The coil 10 is electrically connected to the printed circuit board 7 through the flexible cable 6.

The carriage 3 is swung by an interaction between the magnetic field generated by exciting the voice coil 10 and the magnetic field generated by the magnet 11. The direction and the angle of swing of the carriage 3 are controlled in accordance with the direction and the amount of current which flows through the coil 10, so that the magnetic head 5 is moved onto a desired track of the magnetic disk 2.

The HDD also comprises a lock mechanism 34 of a magnetic attraction type for locking the carriage 3 in a state where the magnetic head 5 is positioned on the CSS zone 2a of the magnetic disk 2. The lock mechanism 34 has a chip magnet 14 serving as a locking magnet and an attractable pin 17 serving as a magnetic member. The chip magnet 14 is much smaller than the motor magnet 11.

The attractable pin 17 is fixed to the distal end portion of the arm 8 of the carriage 3, and the chip magnet 14 is attached to the lower yoke 12 in such a position that the attractable pin 17 is closely contacting the chip magnet 14 when the carriage 3 is swung to the first position. An elastic member 15, made of rubber or the like, is fitted around the chip magnet 14. The elastic member 15 absorbs the shock which occurs when the attractable pin 17 is attracted to and abuts against the chip magnet 14. The elastic member 15 defines a predetermined gap between the attractable pin 17 and the chip magnet 14, and is attached to the lower yoke 12 by means of a fixing pin 16.

The VCM 30 and the lock mechanism 34 will now be described in detail.

Figure 3:
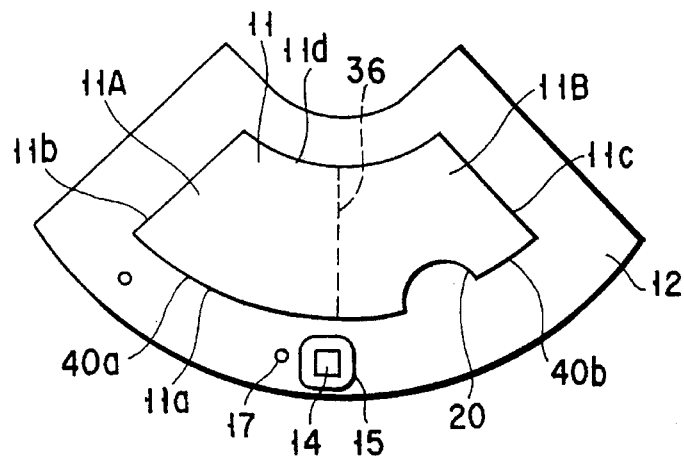

As shown in FIGS. 1 to 3, the motor magnet 11 of the VCM 30 extends in the direction in which the coil 10 is moved in accordance with the swing of the carriage 3. The size of the motor magnet 11 is substantially the same as the range of the movement of the coil 10. More specifically, the magnet 11 is shaped like a fan, and has outer and inner arcuate surfaces 11a and 11d coaxial with the support shaft 4, and a pair of side surfaces 11b and 11c extending in a radial manner with respect to the support shaft 4. Hence, the magnet 11 always faces the coil 10, while the carriage 3 is swung between the first and second positions. The lower yoke 12 is greater than and analogous to the magnet 11.

The magnet 11 includes first and second regions 11A and 11B of the same shape divided with a magnetic boundary 36 which extends in the radial direction of the support shaft 4, passing through the center of the magnet 11 with respect to the circumferential direction. These regions 11A and 11B are magnetized in different directions, respectively. For example, the first region 11A is magnetized such that the upper side is a north pole, and the second region 11B is magnetized such that the upper side is a south pole.

The voice coil 10 attached to the carriage 3 is shaped in a substantially rectangular loop and has a pair of bridge portions 10A and 10B, extending radially with respect to the support shaft 4. When the carriage 3 is swung between the first and the second positions, the bridge portion 10A is moved between a position near the boundary 36 and a position near the side surface 11b of the magnet 11, while opposing to the first region 11A of the magnet 11, and the bridge portion 10B is moved between a position near the side surface 11c of the magnet 11 and the position near the boundary 36, while opposing to the second region 11B of the magnet 11.

The arm 8 of the carriage 3, to which the attractable pin 17 is attached, extends from the support shaft 4 side to a position beyond the outer arcuate surface 11a of the motor magnet 11. The pin 17 is fixed to the distal end portion of the arm 8 and extends toward the lower yoke 12 in parallel to the support shaft 4.

When the carriage 3 is rotated between the first and the second positions, the attractable pin 17 moves in an arcuate path coaxial with the support shaft 4 and is moved between a stop position 42a near the boundary 36 of the motor magnet 11 and an end position 42b near the side surface 11b of the magnet 11, as indicated by the chained lines in FIG. 2. During this time, the attractable pin 17 moves in an arcuate path that opposes that region (opposing region) of the outer arcuate surface 11a which constitutes an outer arcuate surface 40a of the first region 11A of the magnet 11. Since the arcuate path of the attractable pin 17 and the outer arcuate surface 11a of the magnet 11 are coaxial with the support shaft 4, the pin 17 moves along the outer arcuate surface 40a with a constant distance therebetween.

The chip magnet 14 of the lock mechanism 34 is fixed to the lower yoke 12 in such a position so as to attract the attractable pin 17 when the pin 17 is moved to the stop position 42a, i.e., near the magnetic boundary 36 of the magnet 11. Therefore, when the carriage 3 is swung to the first position where the magnetic head 5 is located on the CSS zone 2a of the magnetic disk 2, the attractable pin 17 is attracted to the chip magnet 14 and the carriage 3 is locked in the first position.

As clearly shown in FIGS. 2 and 3, the motor magnet 11 of the VCM 30 has a substantially semicircular recess 20 formed on the outer arcuate surface 11a. The recess 20 is formed in that region (non-opposing region) of the outer arcuate surface 11a which is not opposite the arcuate path of the pin 17 and constitutes an outer arcuate surface 40b of the second region 11B of the magnet 11. Specifically, the recess 20 is located in a central portion of the arcuate surface 40b with respect to the circumferential direction. When the carriage 3 is swung to a substantially intermediate position between the first and the second positions, the bridge portion 10B of the voice coil 10 passes by the recess 20. At this time, the magnetic flux, which is generated from the second portion 11B of the magnet 11 and acts on the voice coil 10, is reduced due to the presence of the recess 20.

Figure 4:
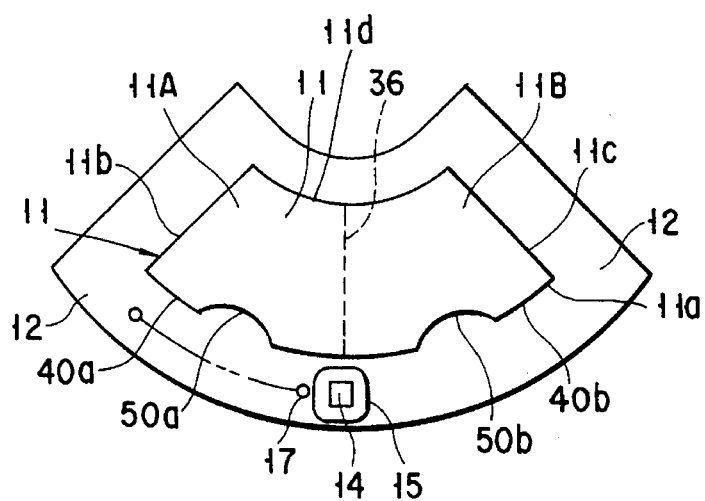
FIG. 4 is a plan view showing part of a VCM comprising a motor magnet, having two recesses, as an example to be compared with the VCM shown in FIGS. 1 to 3.

Next, the driving torque characteristics and the offset torque characteristics of the above-described HDD will be described. Prepared for comparison are three HDDs respectively comprising, as a VCM, a relatively thin motor magnet of a fan shape with no recess, a relatively thick motor magnet of a fan shape with no recess, and a relatively thick motor magnet with a pair of recesses formed on the outer arcuate surface, as shown in FIG. 4. The driving torque and the offset torque of these HDDs and the HDD according to the above-mentioned embodiment of the present invention are examined. Each of the HDDs for comparison has the same constitution as that of the embodiment except for the motor magnet.

In the motor magnet shown in FIG. 4, recesses 50a and 50b are respectively formed in central portions of the outer arcuate surfaces 40a and 40b of the first and the second regions 11A and 11B of the motor magnet 11. The recesses 50a and 50b are smaller than the recess 20 of the embodiment of the present invention.

FIGS. 5A to 5D show the relationship between the driving torque of the VCM and the swing angle θ of the carriage 3 of the HDDs. FIGS. 6A to 6D show the relationship between the offset torque which acts on the attractable pin 17 and the swing angle θ of the carriage 3 of the HDDs.

Figure 5D:
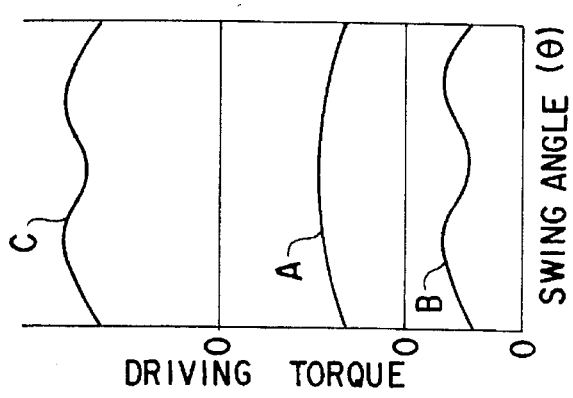
Figure 6D:
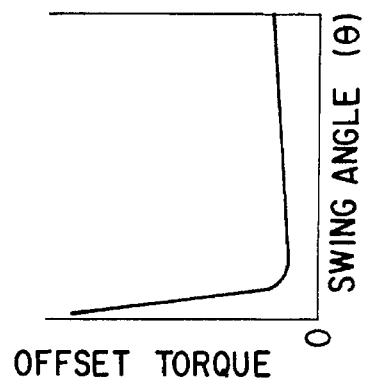
FIGS. 6A to 6D are graphs showing offset torque characteristics of the VCMs shown in FIGS. 5A to 5D, respectively.
Figure 5C:
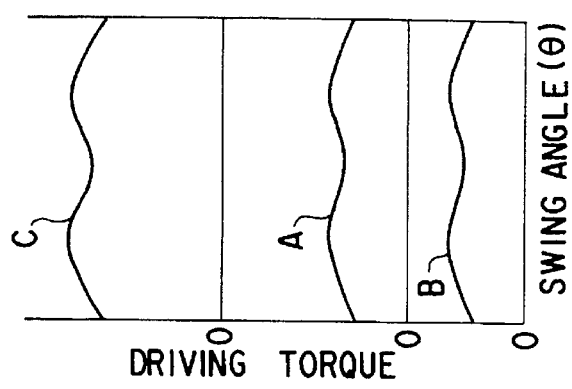
Figure 6C:
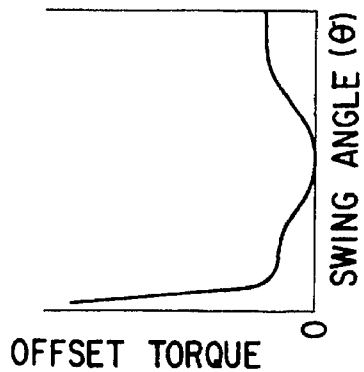
Figure 5B:
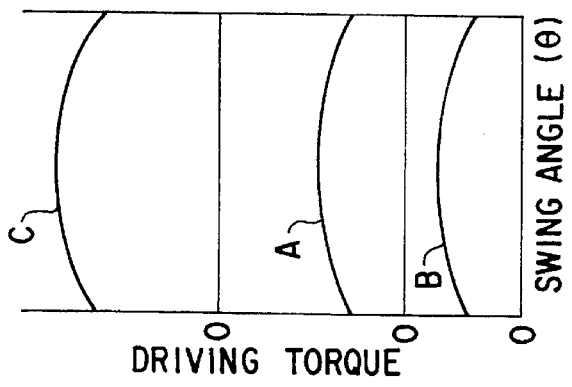
Figure 6B:
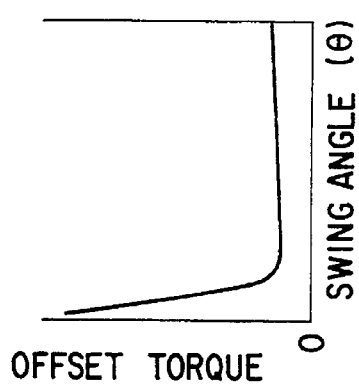
Figure 5A:
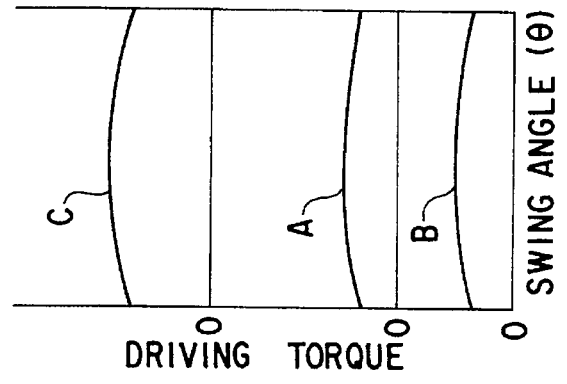
Figure 6A:
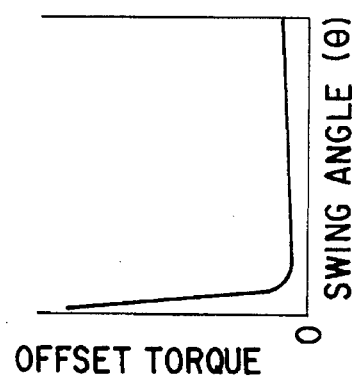

As shown in FIG. 5A, in the VCM having a relatively thin motor magnet of a fan shape with no recess, change in a driving torque A generated by the magnetic flux from the first region 11A of the motor magnet 11 and change in a driving torque B generated by the magnetic flux from the second region 11B have a substantially linear characteristic, respectively. Accordingly, the sum of the torques A and B, i.e., a driving torque C of the entire VCM, also has a linear characteristic. As shown in FIG. 6A, in a state where the carriage 3 is located in the first position and the attractable pin 17 is attracted to the chip magnet 14, a great offset torque, due to the attraction force of the chip magnet, acts on the attractable pin. While the carriage 3 is swung from the first position to the second position, the offset torque is first suddenly reduced, since the attractable pin 17 is spaced from the chip magnet 14, and thereafter, since the attractable pin is subjected to a constant attraction force from the motor magnet 11, the offset torque is also kept substantially constant.

As shown in FIG. 5B, in the VCM having a relatively thick motor magnet of a fan shape with no recess, the characteristics of a driving torque A generated by the magnetic flux from the first region 11A of the motor magnet 11 and a driving torque B generated by the magnetic flux from the second region 11B of the motor magnet 11 are greatly reduced at the first and second positions of the carriage 3. Therefore, at the both ends of the swing motion of the carriage 3, a driving torque C of the entire VCM is reduced and the torque linearity is also neglected. Further, as shown in FIG. 6B, since the attraction force of the motor magnet 11 which acts on the attractable pin 17 is constant, independent of the swing position of the carriage 3, as in the VCM shown in FIGS. 5A and 6A, the offset torque is first suddenly reduced and then kept substantially constant, while the carriage is being swung from the first position to the second position.

In the VCM shown in FIG. 4, since the pair of recesses 50a and 50b are formed on the outer arcuate surface 11a of the motor magnet 11, when the carriage 3 is swung to a substantially intermediate position between the first and the second positions, the magnetic flux which is generated from the first region 11A of the magnet 11 and acts on the voice coil and the magnetic flux which is generated from the second region 11B of the magnet 11 and acts on the coil are reduced. Hence, the driving torques A and B shown in FIG. 5C are lowered in the intermediate position between the first and the second positions of the carriage 3, as compared to the driving torques A and B shown in FIG. 5B. Accordingly, the sum of the torques A and B, i.e., a driving torque C of the entire VCM, is lowered at the first and the second positions of the carriage 3 and at the intermediate position therebetween. Thus, the torque characteristic as a whole is linear, with the result that the torque linearity is improved. However, in this VCM, since the recess 50a is formed in the outer arcuate surface (opposing region) 40a which is opposed to the attractable pin 17 while the pin 17 is moving, the strength and the direction of attraction force which acts on the pin 17 from the first region 11A of the magnet 11 vary while the carriage 3 is swinging between the first and the second positions. Therefore, the offset torque varies greatly, while the carriage 3 is swinging between the first and the second positions, as shown in FIG. 6C. In this case, the positioning of the carriage 3 is difficult to control.

In the HDD according to the present embodiment, the recess 20 is formed only in the outer arcuate surface (non-opposing region) 40b of the second region 11B of the magnet 11, and not in the outer arcuate surface (opposing region) 40a of the first region 11A. In this case, as shown in FIG. 5D, a driving torque A generated by the magnetic flux from the first region 11A of the magnet 11 is reduced at the first and the second positions of the carriage 3, as in the case of FIG. 5B. Further, since the recess 20 is formed in the outer arcuate surface 40b of the second region 11B, when the carriage 3 is moved to a substantially intermediate position between the first and the second positions, the magnetic flux acting on the voice coil 10 from the second region 11B of the magnet 11 is lowered. Hence, the driving torque B generated by the magnetic flux from the second region 11B is lowered in the intermediate position between the first and the second positions, as compared to the driving torque A. Moreover, since the recess 20 is deeper than the recesses 50a and 50b of the VCM shown in FIG. 4, the amount of reduction of the driving torque B at the intermediate portion between the first and the second positions is greater than that of the driving torque B shown in FIG. 5C. Accordingly, the sum of the torques A and B, i.e., the driving torque C of the VCM, is lowered at the first and the second positions of the carriage 3 and at the intermediate position therebetween. Thus, the torque characteristic as a whole is linear, with the result that the torque linearity is improved.

Further, according to the present embodiment, a recess is not formed in the outer arcuate surface (opposing region) 40a of the first region 11A of the magnet 11, which is opposed to the attractable pin while the pin 17 is moving, the attraction force acting on the pin 17 from the first region 11A is kept constant. Therefore, as shown in FIG. 6D, the offset torque is suddenly at first reduced, and thereafter kept substantially constant, while the carriage is swinging from the first position to the second position.

As has been described above, according to the HDD of the present embodiment, the torque linearity of a VCM can be improved without adversely affecting the offset torque. Hence, the VCM can stably swing the carriage 3 with constant motor performance, and easily and accurately control the positioning of the carriage 3 and the magnetic heads 5. In addition, the driving torque can be improved without lowering the motor performance of the VCM, to meet the demand for an increase in the capacity of the HDD.

The present invention is not limited to the above-mentioned embodiment, but various modifications can be made within the spirit and scope of the present invention.

For example, the locking magnet and the magnetic member attached to the carriage are not necessarily provided on the side of the outer arcuate surface of the motor magnet, but may be provided on the side of the inner arcuate surface 11d of the motor magnet. In this case, the recess is formed in the inner arcuate surface of the second region of the motor magnet.

Further, the locking mechanism may be constructed so that the carriage is locked in a position wherein the magnetic head is located at the outside of the outer circumference of the magnetic disk in the non-operating condition of the disk drive. In this case, the recess may be formed in the outer or inner arcuate surface of the first region 11A of the motor magnet.

The shape of the recess formed in the motor magnet is not limited to semicircle, but can be of any shape in accordance with necessity.

What is claimed is:

1. A magnetic disk drive comprising:

a case containing a recording medium;

a carriage arranged in the case to be swingable about a support shaft, between a first position and a second position;

head means supported by the carriage, for processing information with respect to the recording medium;

drive means for swinging the carriage to move the head means to a desired portion of the recording medium; and lock means for locking the carriage in the first position;

the drive means including:

a coil fixed to the carriage and movable in accordance with swing of the carriage in an arcuate path coaxial with the support shaft, the coil wound about a center axis substantially parallel to the support shaft, and a drive magnet arranged in a plane which is substantially perpendicular to the support shaft and opposing the coil over a range in which the coil is movable, the drive magnet having an arcuate surface coaxial with the support shaft; said arcuate surface of the drive magnet including an opposing region and a non-opposing region;

and the lock means including:

a magnetic member attached to the carriage and movable in an arcuate path coaxial with the support shaft in accordance with swing of the carriage, the arcuate path of the magnetic member opposing the arcuate surface of the drive magnet by a constant distance; said magnetic member movable only in the opposing region of said arcuate surface; and a locking magnet provided near the arcuate path of the magnetic member, for attracting the magnetic member when the carriage is rotated to the first position; and the drive magnet having a recess formed only in the non-opposing region thereof for reducing a driving torque of the drive means.

2. A magnetic disk drive according to claim 1, wherein: the drive magnet includes a pair of side surfaces located near ends of the range in which the coil is movable, respectively; a magnetic boundary is positioned on a halfway line between the side surfaces; a first region is defined by one of the side surfaces, the magnetic boundary and the arcuate surface; and a second region is defined by the other of the side surfaces, the magnetic boundary and the arcuate surface, the first and the second regions being magnetized in different directions, respectively;

the coil is shaped in a substantially rectangular loop, and includes a first bridge portion extending radially with respect to the support shaft and being movable between a position near the magnetic boundary and a position near the one of the side surfaces of the drive magnet, the first bridge portion opposing the first region of the drive magnet when the carriage is swung between the first and the second positions, and a second bridge portion extending radially with respect to the support shaft and being movable between a position near the magnetic boundary and a position near the other of the side surfaces of the drive magnet, the second bridge portion opposing the second region of the drive magnet when the carriage is swung between the first and the second positions; and the arcuate surface in the first region of the drive magnet including the opposing region, and the arcuate surface in the second region of the drive magnet including the nonopposing region.

3. A magnetic disk drive according to claim 2, wherein the recess is formed in a substantially central portion of the non-opposing region with respect to the circumferential direction thereof.

4. A magnetic disk drive according to claim 2, wherein the locking magnet is provided near the magnetic boundary and opposing the arcuate surface of the drive magnet; and the locking means comprises an elastic member fitted around the locking magnet, for absorbing shock between the magnetic member and the locking magnet, which occurs when the carriage is swung to the first position.

5. A magnetic disk drive according to claim 1, wherein the carriage comprises arms extending from a side of the support shaft beyond the arcuate surface of the drive magnet; and the magnetic member includes an attractable pin fixed to a distal end of the arm.

6. A magnetic disk drive according to claim 1, wherein the drive magnet includes an outer arcuate surface and an inner arcuate surface which are coaxial with the support shaft, and the recess is formed in the outer arcuate surface.

7. A magnetic disk drive comprising:

a case containing a recording medium;

a carriage arranged in the case to be swingable about a support shaft, between a first position and a second position;

head means supported by the carriage, for processing information with respect to the recording medium;

drive means for swinging the carriage to move the head means to a desired portion of the recording medium; and the drive means including:

a coil fixed to the carriage and movable in accordance with swing of the carriage in an arcuate path coaxial with the support shaft, the coil wound about a center axis substantially parallel to the support shaft, and a drive magnet arranged in a plane which is substantially perpendicular to the support shaft and opposing the coil over a range in which the coil is movable, the drive magnet having an arcuate surface coaxial with the support shaft;

the arcuate surface of the drive magnet including a first region and a second region, the first region defined by that portion of the arcuate surface of the drive magnet opposing a first portion of the arcuate path of the coil, and the second region defined by that portion of the arcuate surface of the drive magnet opposing a second portion of the arcuate path of the coil;

a magnetic member attached to the carriage and movable in an arcuate path coaxial with the support shaft in accordance with swing of the carriage, the arcuate path of the magnetic member opposing the first region of the arcuate surface of the drive magnet by a constant distance;

a locking magnet provided near the arcuate path of the magnetic member, for attracting the magnetic member when the carriage is rotated to the first position;

the drive magnet having a recess formed only in the second region for reducing a driving torque of the drive means.

8. A magnetic disk drive according to claim 7, wherein the recess is formed in a substantially central portion of the second region with respect to the circumferential direction thereof.

9. A magnetic disk drive according to claim 7, wherein the locking magnet including an elastic member fitted therearound for absorbing shock between the magnetic member and the locking magnet, which occurs when the carriage is swung to the first position.

10. A magnetic disk drive according to claim 7, wherein the carriage comprises arms extending from a side of the support shaft beyond the arcuate surface of the drive magnet; and the magnetic member includes an attractable pin fixed to a distal end of the arm.

11. A magnetic disk drive according to claim 7, wherein the drive magnet includes an outer arcuate surface and an inner arcuate surface which are coaxial with the support shaft, and the recess is formed in the outer arcuate surface.

12. A magnetic disk drive comprising:

a case containing a recording medium;

a carriage arranged in the case to be swingable about a support shaft, between a first position and a second position;

head means supported by the carriage, for processing information with respect to the recording medium;

drive means for swinging the carriage to move the head means to a desired portion of the recording medium; and means for stopping the carriage in the first position;

the driving means including:
  a coil fixed to the carriage and movable in accordance with swing of the carriage in an arcuate path coaxial with the support shaft, the coil wound about a center axis substantially parallel to the support shaft, and
  a drive magnet arranged in a plane which is substantially perpendicular to the support shaft and opposing the coil over a range in which the coil is movable, the drive magnet having an arcuate surface coaxial with the support shaft; said arcuate surface of the drive magnet including an opposing region and a non-opposing region;

and the stopping means including:
  a movable member attached to the carriage and movable in an arcuate path coaxial with the support shaft in accordance with swing of the carriage, the arcuate path of the movable member opposing the arcuate surface of the drive magnet by a constant distance; said movable member movable only in the opposing region of said arcuate surface; and
  a stop member provided near the arcuate path of the movable member, for stopping the movable member when the carriage is rotated to the first position, and the drive magnet having a recess formed only in the non-opposing region thereof for reducing a driving torque of the drive means.

13. A magnetic disk drive according to claim 12, wherein the recess is formed in a substantially central portion of the non opposing region with respect to the circumferential direction thereof.

14. A magnetic disk drive according to claim 12, wherein the stop member including an elastic member fitted therearound for absorbing shock between the movable member and the stop member, which occurs when the carriage is swung to the first position.

15. A magnetic disk drive according to claim 12, wherein the carriage comprises arms extending from a side of the support shaft beyond the arcuate surface of the drive magnet; and the movable member includes a pin fixed to a distal end of the arm.

16. A magnetic disk drive according to claim 12, wherein the drive magnet includes an outer arcuate surface and an inner arcuate surface which are coaxial with the support shaft, and the recess is formed in the outer arcuate surface.

* * * * *